United States Patent [19]

Leonard

[11] E Re. 28,856

[45] Reissued June 15, 1976

[54] LOW-LOSS CLOSED-LOOP SUPPLY SYSTEM FOR TRANSFERRING LIQUIFIED GAS FROM A LARGE CONTAINER TO A SMALL CONTAINER

[75] Inventor: Kenneth R. Leonard, Boulder, Colo.

[73] Assignee: Cryogenic Engineering Company, Denver, Colo.

[22] Filed: July 18, 1974

[21] Appl. No.: 489,518

Related U.S. Patent Documents

Reissue of:

[64] Patent No.: 3,710,584
Issued: Jan. 16, 1973
Appl. No.: 83,460
Filed: Oct. 23, 1970

[52] U.S. Cl. ..... 62/54; 62/55; 137/210; 220/85 VR

[51] Int. Cl.[2] ..... F17C 13/00

[58] Field of Search ..... 220/85 VR, 85 VS; 141/37; 137/210; 62/54, 55

[56] References Cited

UNITED STATES PATENTS

| | | | |
|---|---|---|---|
| 2,487,863 | 11/1949 | Garretson | 62/55 |
| 2,632,302 | 3/1953 | Steele | 62/55 |
| 3,034,308 | 5/1962 | Littlewood | 62/54 |
| 3,106,071 | 10/1963 | Green et al. | 62/55 |
| 3,369,371 | 2/1968 | Holly et al. | 62/54 |

*Primary Examiner*—William F. O'Dea
*Assistant Examiner*—Ronald C. Capossela
*Attorney, Agent, or Firm*—Griffin, Branigan & Butler

[57] ABSTRACT

A liquified gas is transferred from a supply tank to a saddle tank by gravity flow. After a predetermined amount of the liquified gas has been transferred, gravity flow is stopped and pressure is equalized between the saddle tank and the container to be filled. Thereafter, vapor from the container flows into the supply tank causing liquified gas to flow from the saddle tank into the container. After the container has received a predetermined amount of liquified gas, liquid flow ends and pressure is equalized between the supply and saddle tanks.

34 Claims, 6 Drawing Figures

LOW-LOSS CLOSED-LOOP SUPPLY SYSTEM FOR TRANSFERRING LIQUIFIED GAS FROM A LARGE CONTAINER TO A SMALL CONTAINER

Matter enclosed in heavy brackets [ ] appears in the original patent but forms no part of this reissue specification; matter printed in italics indicates the additions made by reissue.

BACKGROUND OF THE INVENTION

This invention relates to a method and apparatus for filling small containers from large containers and more particularly to a method and apparatus for filling a small container with liquified gas from a large container, without the loss of gas vapor.

It is often necessary to transfer liquified gases from larger containers to smaller containers. For example, oxygen converters used for converting liquified oxygen (LOX) to a gas for use by the crews of high altitude aircraft are usually filled from larger tanks; and, in this regard, objects of this invention are to provide a new and improved method and apparatus for transferring a liquified gas from one container to another.

Many of the transferred gases are quite volatile and tend to boil off rapidly during conventional transfer methods. Hence, because many of these gases are also quite expensive to produce, it is another object of this invention to provide a particularly low-loss method of transferring a liquified gas from a large container to a small container.

Some liquified gas vapors that are released during conventional transfer methods are highly dangerous because they readily support combustion. In addition, flammable gases such as hydrogen and natural gas often must be transferred from large containers to small containers for use at particular locations. If gas vapors are released during the transfer of flammable gases, they produce a highly dangerous environment because of both combustability and possibly inhalation. Consequently, it is another object of the invention to provide a safer method and apparatus for performing the desired transfer without vapor of the transferred gas boiling off into the atmosphere.

It is still a further object of this invention to provide a new method and apparatus for transferring cryogenic fluids in a manner which does not require expensive cryogenic pumps so as to further reduce boil off losses.

SUMMARY OF THE INVENTION

In accordance with principles of this invention, the liquified gas is first transferred from a supply tank to an intermediate tank by gravity flow. After a predetermined amount of the liquified gas has been transferred in this manner, pressure is equalized between the intermediate tank and the container to be filled. Thereafter, pressure from the container is bled down into the supply tank causing liquified gas to flow from the intermediate tank into the container. Transfer is ended after the container has received a desired amount of liquified gas. Thereafter, pressure is equalized between the supply and intermediate tanks, and the cycle is repeated to fill a second container.

In accordance with other principles of this invention, the supply container and the intermediate container are vacuum insulated, as are the lines interconnecting the supply tank, the intermediate tank and the converter so as to further conserve gas by preventing boil-off loss.

It will be appreciated from the foregoing summary that the invention provides an uncomplicated method and equally uncomplicated apparatus for transferring a liquid gas from a supply container or tank to a smaller container or converter with low vapor loss. By utilizing the pressures in the tanks and gravity to cause the liquified gas to flow, the need for an expensive cryogenic pump is eliminated. In addition, the high boil-off associated with the use of cryogenic pumps is also eliminated.

While the illustrated use of the herein described invention is to transfer LOX from a supply container to a converter, and thus reduce the vapor danger associated with such transfers, it will be appreciated that the invention can be utilized to transfer other types of liquified gases. For example, the invention can be utilized to transfer flammable liquified gases, such as hydrogen and natural gas.

BRIEF DESCRIPTION OF THE DRAWINGS

The foregoing objects and many of the attendant advantages of this invention will become more readily appreciated as the same become better understood when taken in conjunction with the accompanying drawings, wherein.

DESCRIPTION OF A PREFERRED EMBODIMENT

Figure 1:
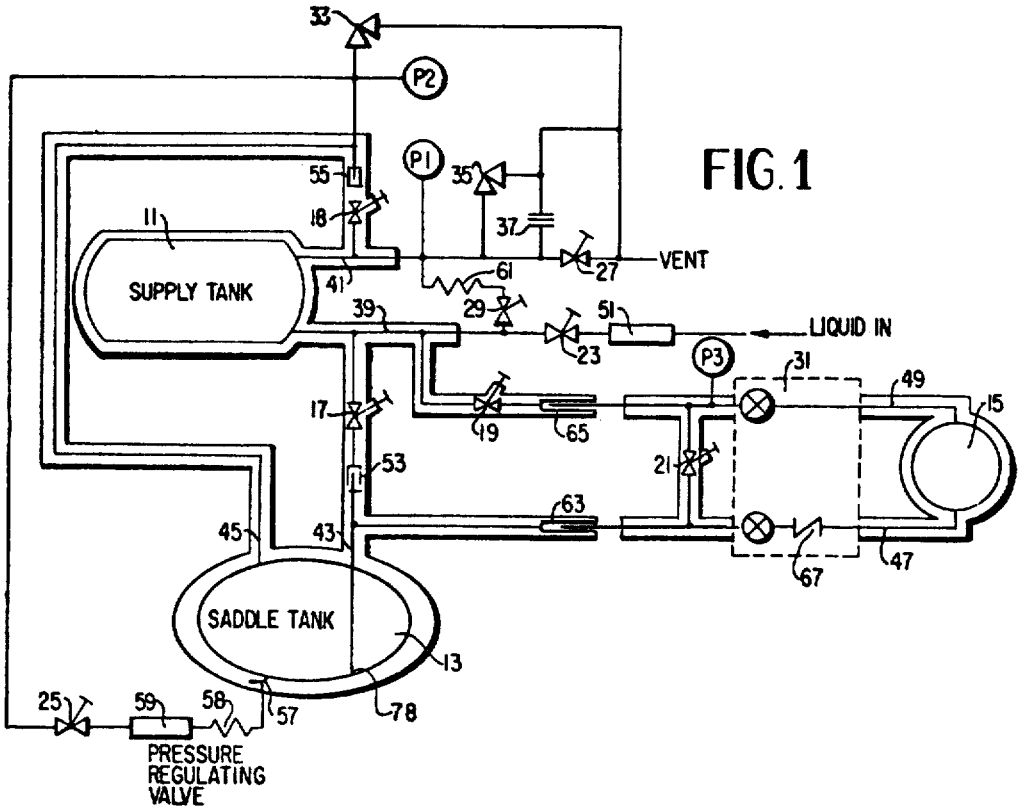
FIG. 1 is a schematic diagram illustrating a preferred embodiment of the invention.

FIG. 1 illustrates a preferred embodiment of the invention and comprises: a supply tank 11; an intermediate tank 13; a converter 15; four primary valves 17, 18, 19 and 21; four secondary valves 23, 25, 27 and 29; an automatic valve 31; two pressure relief valves 33 and 35; a rupture disc 37; and, three pressure indicators designated P1, P2 and P3.

The supply tank has a liquid input/output line 39 and a vapor input/output line 41; the intermediate tank 13 which is of the saddle-type has a liquid input/output line 43 and a vapor input/output line 45; and, the converter has a liquid input/output line 47 and a vapor input/output line 49. The liquid input/output line 39 of the supply tank is connected by pipes through the first secondary valve 23 and a filter 51 to an input connection. The input connection allows liquified oxygen (or another liquified gas, as the case may be) to be inserted into the supply tank 11 to fill that tank. The liquid input/output line 39 of the supply tank 11 is also connected by pipes through the first primary valve 17 and a first supply saddle coupling member 53 to the liquid input/output line 43 of the saddle tank 13. The vapor input/output line 45 of the saddle tank 13 is connected by pipes through a second supply/saddle coupling member 55 and the second primary vale 18 to the vapor input/output line 41 of the supply tank 11.

A pressure sensor 57, located in the saddle tank, is connected by pipes through a heat exchanger coil 58, a pressure regulating valve 59, and the second secondary valve 25 to the pipe line connecting the vapor input-/output lines of the saddle and supply tanks 11 and 13. The same pipe line is also connected to P2 and through the first pressure relief valve 33 to a vent output. The vapor input/output line 41 of the supply tank 11 is also connected by a pipe through the third secondary valve 27 to the vent output, through the second pressure relief valve 35 to the vent output and through the rupture disc 37 to the vent output. In addition, the vapor input/output line 41 of the supply tank 11 is connected to P1. The liquid input/output line 39 of the supply tank 11 is connected by a pipe through the fourth secondary valve 29 and a heat exchanger coil 61 to the vapor input/output line 41 of the supply tank 11.

The liquid input/output line 43 of the saddle tank 13 is connected by pipes through a saddle-converter coupling member 63 to a first terminal on one side of the automatic valve 31. The liquid input/output line of the supply tank 39 is connected by pipes through the third primary valve 19 and a supply/converter coupling element 65 to a second terminal on the same side of the automatic valve 31. The fourth primary valve 21 is in a pipe connected across the first and second terminals on this same side of the automatic valve 31. In addition, P3 is connected to the pipe line that connects the liquid input/output line 39 of the supply tank 11 to the automatic valve 31. The other side of the automatic valve 31 is connected by pipes to the liquid and vapor input-/output lines 47 and 49 of the converter 15.

All of the pipe lines connecting the supply tank to the saddle tank and connecting the supply and saddle tanks to the converter are vacuum insulated to prevent undesirable boil-off. The remaining lines are not illustrated as being insulated, however, they may be insulated, if desired. The insulated lines connecting the supply tank and the saddle tank and the converter form the primary apparatus of the invention and are utilized to carry out the method as hereinafter described with respect to FIGS. 2, 3 and 4. The remaining lines provide a means for filling the supply tank as well as for venting the various vapor lines and tanks as necessary to the normal operation of a liquified gas system, as will be understood by those skilled in the art. For example, the first pressure relief valve 33 provides pressure relief for the saddle tank. Similarly, the second pressure relief valve 35 provides pressure relief for the supply tank. The heat exchanger coil 58 and 61 allows vaporization of the liquid to build pressure in their respective saddle and supply tanks, when desired.

Turning now to a description of the operation of the apparatus illustrated in FIG. 1 for carrying out the method of the invention; it is initially assumed that the pressure in both the supply tank and the saddle tank is zero psig. In addition, it is assumed that the pressure in the converter tank is in the range of 50–100 psig. Similarly, it is assumed that the temperature of the converter is substantially at liquified oxygen temperature. Moreover, in accordance with the principles of the invention, the saddle tank is at a lower elevation than the supply tank.

Figure 2:
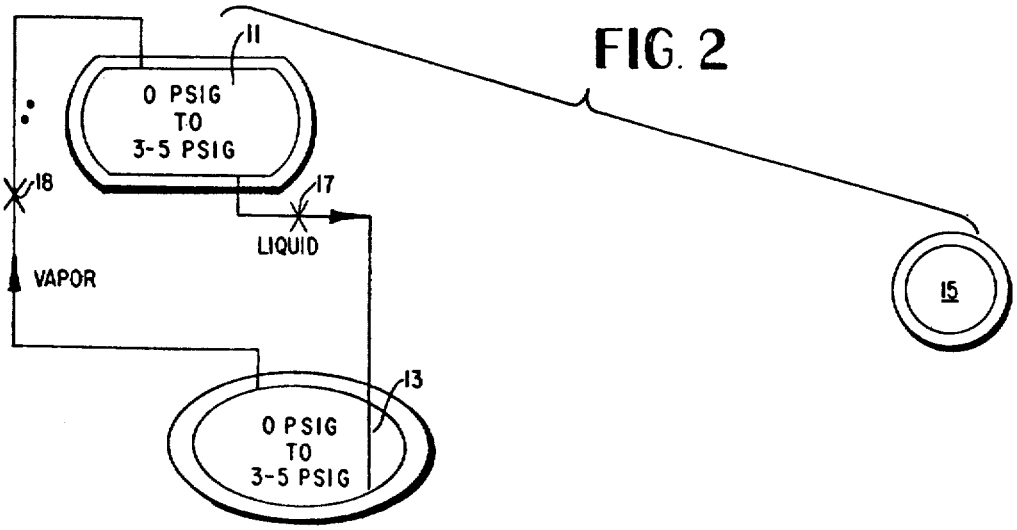
FIGS. 2, 3, and 4 are schematic diagrams illustrating the sequence of transfer between the supply container and the container to be filled.
Figure 3:
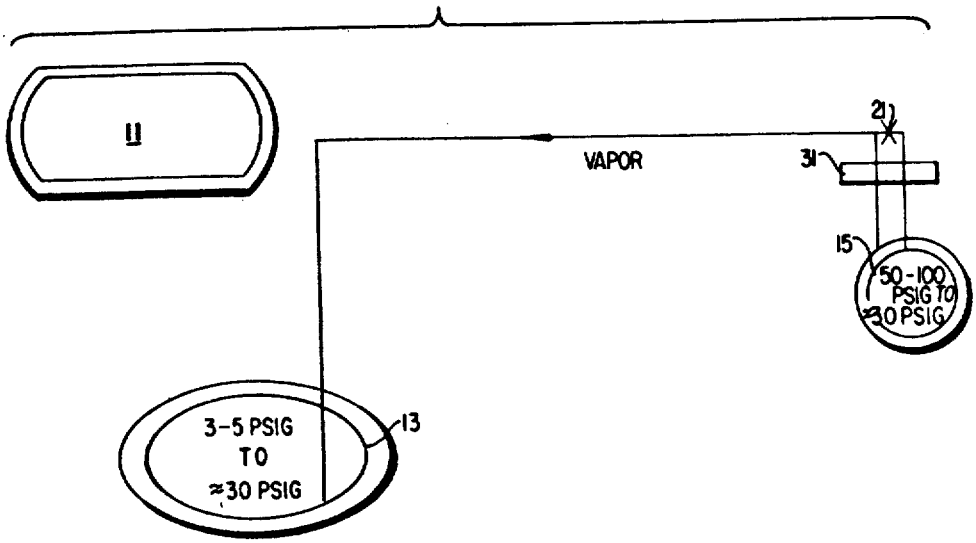

The first step of the method of the invention is the opening of the first and second primary valves 17 and 18 (FIG. 2). When this occurs, the liquid flows by gravity from the supply tank 11 through the first valve 17 into the saddle tank and vapor flows from the saddle tank through the second valve 18 into the supply tank. When the desired amount of liquid has flowed from the supply tank to the saddle tank, the first and second primary valves 17 and 18 are closed. This liquid-vapor flow increases pressure slightly in both tanks to about 3–5 psig, for example.

Next the converter 15 is coupled to the system and the automatic valve 31 and the fourth primary valve 21 are opened. In accordance with this step of the method (FIG. 3), pressure is equalized between the converter and the saddle tank through the saddle/converter coupling element 63. When the pressure in these two tanks has equalized, they will both be at a value of, for example, 30 psig, depending upon the size of the tanks.

Figure 4:
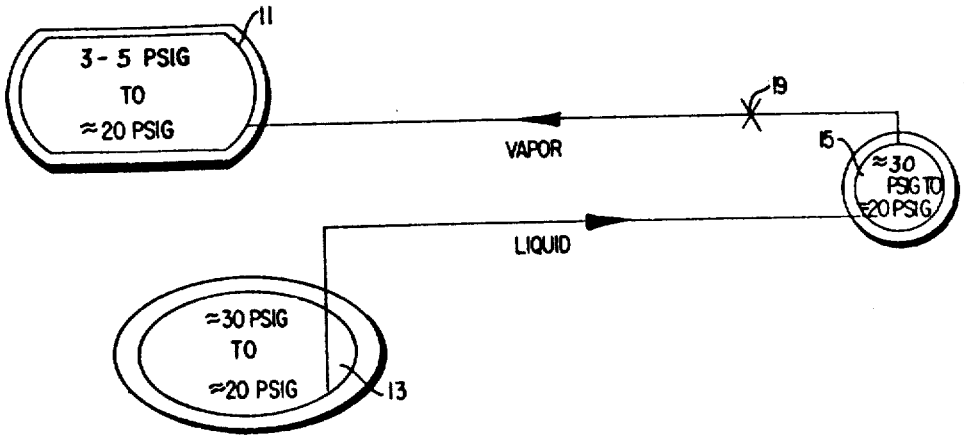

In accordance with the method of the invention, after equalization between the converter and the saddle tank has been completed, the fourth primary valve 21 is closed and the third primary valve 19 is opened (FIG. 4). When the third primary valve is opened and the fourth primary valve is closed, the pressure differential between the converter 15 and the supply tank 11 causes vapor to flow from the converter 15 to the supply tank 11. This action causes liquid to flow from the saddle tank 13 into the converter 15. Any vapor produced by this liquid flow passes into the supply tank 11 and bubbles through the liquid phase in the supply tank to cause turbulence in the supply tank which reduces thermal stratification and undue pressure rise in the supply tank. To prevent reverse vapor flow from the converter 15 to the saddle tank 13 a one-way valve 67 is included in the automatic valve 31.

When the converter has filled to a satisfactory level, the third primary valve 19 is closed. In addition, the automatic valve 31 is closed and the converter is disconnected. The second primary valve 18 is then opened to bring the pressure in the saddle tank down to the pressure in the supply tank. Because of the accumulation of vapor in these insulated tanks, the pressure in the tanks will rise, up to 20 psig, for example.

When it is desired to fill another converter from the supply tank, the foregoing cycle is repeated. However, in this case, the supply tank starts at an initial pressure of about 20 psig. Hence, at the end of the filling of the second converter, the pressure in the supply and saddle tanks will be about 40 psig, for this example. Consequently, ultimately, it will become necessary to reduce the pressure in the supply and saddle tanks.

Figure 5:
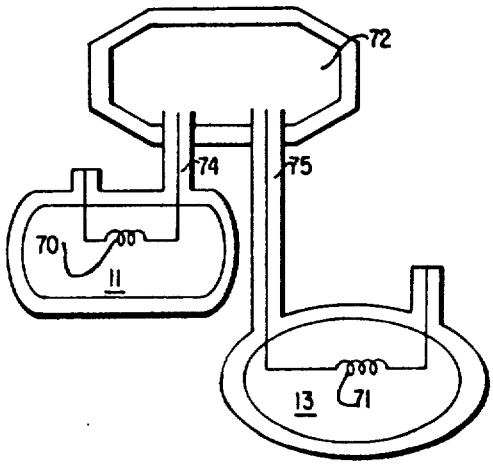
FIG. 5 is a schematic diagram of a condensing system for use with the embodiments of the invention illustrated in FIGS. 1 and 6; and, FIG. 6 is a schematic diagram illustrating an alternate embodiment of a portion of the structure illustrated In FIG. 1.

Pressure in the supply tank 11 and intermediate tank 13 is, preferably, reduced by either of two methods. In accordance with the first method, these tanks are removed to a remote area and bled down by allowing the oxygen vapor to be vented into the atmosphere. In accordance with the second method, the tanks may be provided with condensing loops 70 and 71 in FIG. 5 for circulating liquified nitrogen from a nitrogen supply tank 72.

In the above regard, liquified nitrogen from the condensing fluid tank 72 is directed by means of suitable valving, not shown, through insulated lines 74 and 75 into the loops 70 and 71 where the tank vapors are condensed in the tanks themselves. The nitrogen vapors are then vented to the atmosphere as illustrated in the FIG. 5 schematic. In this manner the pressures in the supply and saddle tanks are not only reduced to substantially zero but the tank vapors are condensed and recovered without the possible danger of their being released into the atmosphere.

When the method of the invention is used with the above described structure vapor from the converter 15 flows out of end 78 of line 43 after the converter is coupled to the system and valves 21 and 31 are opened. Hence, the vapor from 78 flows upwardly through the saddle tank's liquid to cause turbulence which, in many cases is undesirable. Note in this regard, that the intermediate tank 13 is not a long term "storage" tank and, therefore, does not have the thermal stratification problems of the supply tank 11. Consequently, although it can be advantageous for vapor to bubble through the liquid phase of the supply tank, this is not generally the case with the intermediate tank.

Figure 6:
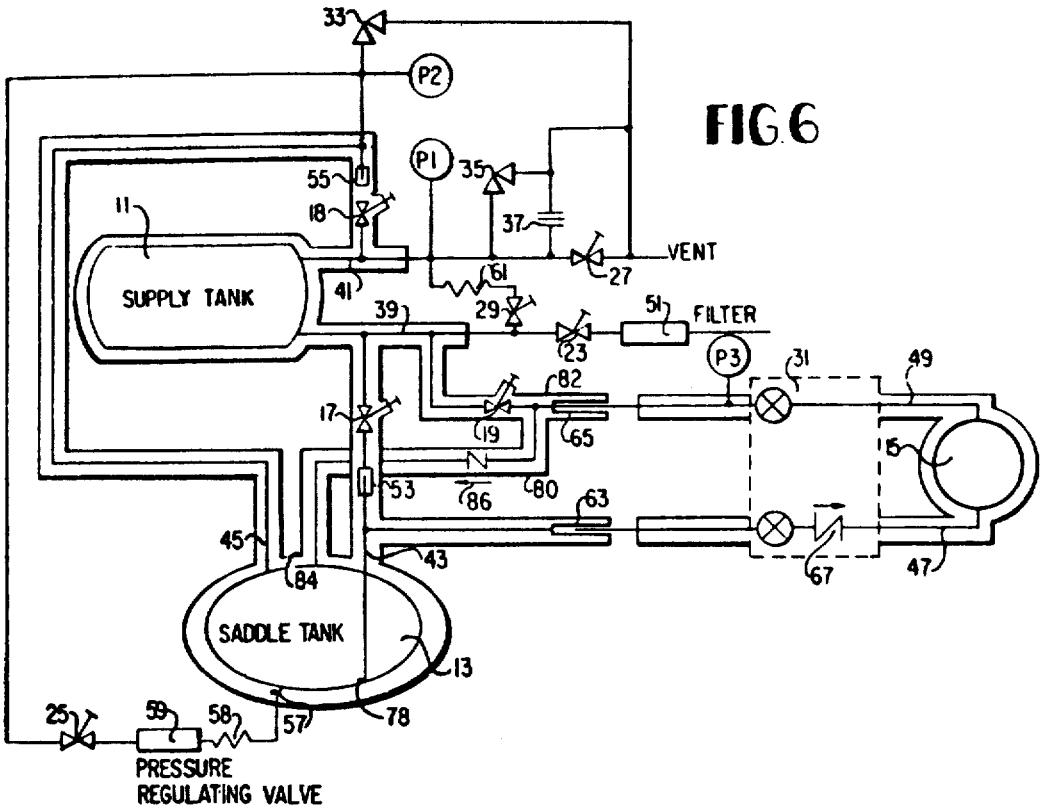

The FIG. 6 structure eliminates both the bubbling of vapor from the converter 15 through the saddle tank's liquid phase and eliminates the need for the FIG. 1 embodiment's valve 21. In this regard, the FIG. 6 embodiment includes a vacuum insulated line 80 extending between point 82 on the supply tank's link 39 and point 84 at the top of the saddle-type intermediate tank 13. The line 80 includes a one-way check valve 86 for permitting vapor to flow only in the direction of the arrow (toward point 84); and does not include either a valve such as 21 or a line extending between the converter's liquid-input and vapor-output lines. The remainder of the FIG. 6 embodiment is the same as FIG. 1 and will not be further described.

The operation of the FIG. 6 embodiment is similar to that of FIG. 1. In this regard, liquid is first transferred from the supply tank to the intermediate tank and the pressure therebetween is equalized before the supply and saddle tanks are isolated. Next, the converter is coupled to the system at coupling elements 63 and 65; and vapor from converter 15 flows into the top of the saddle tank 13 through line 80 and the check valve 86. When the pressure in these tanks in thusly equalized, valve 19 is opened to permit vapor from converter 15 to flow into the supply tank 11 in the same manner as was described in connection with the first embodiment. Similarly, as the pressure in the converter drops, fluid from the saddle tank is forced through line 43 and check valve 67 into the converter. It should be noted that the check valve 86 prevents the vapor from the saddle tank from flowing at this time into either the supply tank or the converter. In other respects, operation of the two embodiments is the same.

It will be appreciated from the foregoing description that the invention comprises a method and apparatus for filling a small container or converter from a large container or supply tank. In general, the method comprises the steps of: equalizing the pressure between first and second vessels in the supply system; transferring liquid from the first vessel to the second vessel and transferring vapor from the second vessel to the first vessel; isolating the first vessel from the second vessel; equalizing the pressure between the second vessel and the container for receiving the liquified gas; isolating the vapor phase of the second vessel from the vapor phase of the container for liquified gas; connecting the first vessel to the container; connecting the second vessel to the container for liquified gas so that liquid from said second vessel flows into said container while vapor from the container flows into the first vessel; and, isolating the container from said first and second vessels. It will be appreciated that this method has certain advantages in that it eliminates the necessity for pumping the liquified gas from one vessel to a second vessel. In addition it eliminates some of the other inherent disadvantages of former such systems. Moreover, because constant interconnections are provided, vapor loss is greatly reduced over prior art container filling systems; and the method also has the advantage of reducing stratification in the supply tank.

In addition to being an uncomplicated method, the invention also provides for safe recovery of the supply tank vapors; and provides uncomplicated apparatus for carrying out the method in that only a small quantity of interconnecting lines and valves are utilized to carry out the method of the invention.

While a preferred embodiment of the invention has been illustrated and described, it will be appreciated by those skilled in the art and others that various changes can be made therein without departing from the spirit and scope of the invention.

For example, although the vapor condensation step has been described in terms of both supply tank 11 and saddle tank 13, it will be apparent that were the vapor phases of the two tanks are connected together as by valve 18, the condensation step can take place by connection of either tank into one of the loops 70.

The embodiments of the invention in which an exclusive property or privilege is claimed are defined as follows:

1. A low-loss method of filling a container for liquified gas from a supply system comprising the steps of:

transferring liquid from a first vessel into a second vessel, and transferring vapor from said second vessel to said first vessel whereby the pressure between said first and second vessels remains equalized as said liquid is transferred;

isolating said first vessel from said second vessel;

equalizing the pressure between said second vessel and said container for liquid gas;

connecting said first vessel to said container for liquified gas to permit vapor to flow therebetween;

connecting said second vessel to said container for liquified gas so that said liquid from said second vessel flows into said container for liquified gas, and maintaining the connection between said first vessel and said container for liquified gas to permit vapor from said container for liquified gas to flow into said first vessel.

2. A low-loss method of filling a container for liquified gas from a supply system as claimed in claim 1 including the additional step of:

disconnecting said container for liquified gas from said first and second vessels.

3. A low-loss method of filling a container for liquified gas from a supply system as claimed in claim 1 wherein said liquified gas is liquid oxygen.

4. The method of claim 1 including the step of connecting the vapor phase of said container to the vapor phase of said second vessel during said step of equalizing the pressure between said second vessel and said container.

5. The method of claim 1 including the step of isolating the vapor phase of said second vessel from the vapor phase of said container after said step of equalizing the pressue between said second vessel and said container.

6. A low-loss method of filling a container for liquified gas from a supply system as claimed in claim 1 wherein said liquid is transferred from said first vessel into said second vessel by gravity.

7. A low-loss method of filling a container for liquified gas from a supply system as claimed in claim 6 wherein said liquified gas is liquified oxygen.

8. The method of claim 1 including the step of condensing vapors from at least one of said first and second vessels.

9. The method of claim 8 including the step of returning the condensate to the liquid phase of at least one of said first and second vessels.

10. The method of claim 1 including an additional equalization step after said container is filled wherein the vapor phases of said first and second vessels are connected to bring the pressure of said second vessel down to the pressure of said first vessel.

11. The method of claim 10 including the step of condensing vapors from at least one of said first and second vessels.

12. The method of claim 11 including the step of returning the condensate to the liquid phase of at least one of said first and second vessels.

13. A pump-free low-loss supply system for filling a container for liquified gas comprising:

a supply tank for housing said liquified gas;

an intermediate tank for temporarily storing said liquified gas;

first interconnecting means for interconnecting said intermediate tank to said supply tank for allowing liquid to flow from said supply tank to said intermediate tank and vapor to flow from said intermediate tank to said supply tank; and second interconnecting means for interconnecting said intermediate tank and supply tank to said container so as to allow gas from said container to flow from said container to said intermediate tank and thereafter allow liquid from said intermediate tank to flow into said container while vapor from said container for liquified gas flows into said supply tank, said liquid being transferred pump-free from said supply tank to said container.

14. A low-loss supply system for filling a container for liquified gas as claimed in claim 13 wherein said liquified gas is liquified oxygen.

15. A low-loss supply system for filling a container for liquified gas as claimed in claim 13 wherein said intermediate tank is mounted at a lower elevation than said supply tank whereby liquid flows from said supply tank to said intermediate tank by gravity.

16. A low-loss supply system for filling a container for liquified gas as claimed in claim 15 wherein:

said supply tank includes an input/output vapor line and an input/output liquid line;

said intermediate tank includes an input/output vapor line and an input/output liquid line; and, said first interconnecting means comprises:

a first valve;

a first pipeline for interconnecting said first valve, said input/output vapor line of said supply tank and said input/output vapor line of said intermediate tank;

a second valve; and, a second pipeline for interconnecting said input/output liquid line of said supply tank, said second valve and said input/output liquid line of said intermediate tank.

17. A low-loss supply system for filling a container for liquified gas as claimed in claim 16 wherein said second interconnecting means comprises:

a third valve;

a fourth valve having first and second terminals on a first side and first and second terminals on a second side, the first terminal on said first side connected through an intermediate valve to the first terminal on said second side and the second terminal on said first side connected through another intermediate valve to the second terminal on the second side;

a third pipeline, said third pipeline interconnecting the input/output liquid line of said supply tank, said third valve and the first terminal on the first side of said fourth valve;

a fourth pipeline, said fourth pipeline interconnecting the input/output liquid line of said intermediate tank to the second terminal on the first side of said fourth valve; and, a fifth valve, interconnecting the first and second terminals on the first side of said fourth valve, the first and second terminals of the second side of said fourth valve connected to said container.

18. A low-loss supply system for filling a container for liquified gas as claimed in claim 17 wherein said liquified gas is liquified oxygen.

19. A low-loss supply system for filling a container for liquified gas as claimed in claim 17 wherein said supply tank and said intermediate tank are cryogenic storage vessels and wherein said first, second, third and fourth pipelines are insulated pipelines.

20. The structure of claim 13 including condensing loop means for condensing vapors from at least one of said tanks.

21. The structure of claim 20 wherein said loop means is located so that condensed vapors are returned to the liquid phase of one of said tanks.

22. The structure of claim 20 wherein said loop means is located inside of one of said tanks.

23. The structure of claim 13 including:

a source of condensing fluid;

a condenser; and means for directing said condensing fluid to said condenser located so that vapors from at least one of said tanks is brought into contact therewith and causes said vapors to condense.

24. The structure of claim 23 wherein said condenser is located so that condensed vapors are returned to the liquid phase of one of said tanks.

25. The structure of claim 23 wherein said condenser is located inside of one of said tanks.

26. The structure of claim 13 wherein said second interconnecting means includes a pipeline for connecting the vapor phase of said container to the vapor phase of said intermediate tank.

27. The structure of claim 26 including a one-way valve in said pipeline for preventing the flow of gas in said pipeline in a direction out of said intermediate tank.

28. The structure of claim 26 including:

a source of condensing fluid; a condenser, and, means for directing said condensing fluid to said condenser located so that vapors from at least one of said tanks is brought into contact therewith and causes said vapors to condense.

29. The structure of claim 28 wherein said condenser is located so that condensed vapors are returned to the liquid phase of one of said tanks.

30. The structure of claim 29 wherein said condenser is located inside of one of said tanks.

*31. A low-loss method of filling a container for liquified gas from a supply system comprising the steps of:*

*transferring liquid from a first vessel into a second vessel, and transferring vapor from said second vessel to said first vessel whereby the pressure between said first and second vessels remains equalized as said liquid is transferred;*

*isolating said first vessel from said second vessel;*

*connecting said second vessel and said container for liquified gas to equalize the pressure between said second vessel and said container for liquified gas;*

*connecting said first vessel to said container for liquified gas to permit vapor to flow therebetween;*

*vapor thereby being permitted to flow from said container for liquified gas into said first vessel and liquid thereby being permitted to flow from said second vessel into said container for liquified gas.*

*32. The method of claim 31 including the step of permitting the pressure of said second vessel to become higher than the pressure of said container for liquified gas.*

*33. A pump-free low-loss supply system for filling a container for liquified gas comprising:*

*a supply tank for housing said liquified gas;*

*an intermediate tank for temporarily storing said liquified gas;*

*first interconnecting means for interconnecting said intermediate tank to said supply tank for allowing liquid to flow by gravity from said supply tank to said intermediate tank and vapor to flow from said intermediate tank to said supply tank; and*

*second interconnecting means for interconnecting said intermediate tank and supply tank to said container so as to allow liquid from said intermediate tank to flow into said container and vapor from said container for liquified gas to flow into said supply tank, said liquid thereby being transferred pump-free from said supply tank to said container.*

*34. The system of claim 33 including means for raising the pressure of said intermediate tank above the pressure of said container for liquified gas.*

* * * * *